United States Patent [19]
Parker et al.

[11] Patent Number: 5,373,578
[45] Date of Patent: Dec. 13, 1994

[54] STRIPPABLE COATING FOR OPTICAL FIBER

[75] Inventors: Theodore L. Parker, Alpharetta, Fulton County; James R. Petisce, Norcross, Gwinnett County, both of Ga.; Lloyd Shepherd, Madison, Morris County, N.J.; Carl R. Taylor, Lawrenceville, Gwinnett County, Ga.

[73] Assignee: AT&T Corp., Murray Hill, N.J.

[21] Appl. No.: 170,885

[22] Filed: Dec. 21, 1993

[51] Int. Cl.$^5$ ............................................. G02B 6/22
[52] U.S. Cl. ..................................... 385/128; 385/145; 385/141; 428/375; 428/392; 65/410; 65/432
[58] Field of Search ............... 385/128, 123, 126, 141, 385/114, 124, 125, 144, 145; 428/391, 383, 373, 375, 392, 394; 522/99; 525/477, 925; 65/3.1, 3.43

[56] References Cited

U.S. PATENT DOCUMENTS

| | | | |
|---|---|---|---|
| 4,472,021 | 9/1984 | Ansel et al. | 350/96.23 |
| 4,474,830 | 10/1984 | Taylor | 427/54.1 |
| 4,740,055 | 4/1988 | Kanada et al. | 385/128 X |
| 4,851,165 | 7/1989 | Rennell, Jr. et al. | 264/1.5 |
| 4,900,126 | 2/1990 | Jackson et al. | 350/46.23 |
| 4,929,051 | 5/1990 | Rogler et al. | 385/141 |
| 5,011,260 | 4/1991 | Marx et al. | 350/96.23 |
| 5,015,068 | 5/1991 | Petisce | 385/123 |
| 5,062,685 | 11/1991 | Cain et al. | 385/128 |
| 5,136,679 | 8/1992 | Broer et al. | 385/128 |
| 5,146,531 | 9/1992 | Shustack | 385/128 |
| 5,181,269 | 1/1993 | Petisce | 385/128 |

Primary Examiner—John D. Lee
Assistant Examiner—Phan Thi Heartney
Attorney, Agent, or Firm—Michael A. Morra

[57] ABSTRACT

A coating system for individual glass fibers of a lightwave communications system has improved strippability, particularly in situations where a group of such fibers are arrayed together in what is known as a ribbon. A preferred embodiment includes two layers (primary and secondary) of polymeric materials surrounding the glass fiber. The primary layer comprises an oligomer (50-80% by weight), a diluent (15-40% by weight), and additives (5-35% by weight). The oligomer comprises polyol "A," diisocyanate "B," and a hydroxy-terminated alkyl acrylate "C" having the structure C-B-A-B-C. At least one of the additives contains a non-cross-linked hydrocarbon component (1-20% by weight) having a structure $R_1$—$(R)_n$—$R_2$; where $R_1$, $R_2$ comprises an alkyl group or an OH group, and R is a combination of C, H or C, H, O. In an alternative embodiment, the need for a diluent is substantially eliminated by using an oligomer having the structure E-D-E where "D" represents a carboxy-terminated polyol, and "E" represents a glycidyl acrylate.

18 Claims, 3 Drawing Sheets

STRIPPABLE COATING FOR OPTICAL FIBER

TECHNICAL FIELD

This invention relates generally to a protective coating for an optical fiber, and more particularly to a coating which can be easily removed from the optical fiber.

BACKGROUND OF THE INVENTION

In the manufacture of optical fiber, a glass preform rod is suspended vertically and moved into a furnace at a controlled rate. The preform softens in the furnace and a glass fiber (also referred to as an optical fiber) is drawn freely from the molten end of the preform rod by a capstan located at the base of a draw tower. Because the surface of the glass fiber is susceptible to damage caused by abrasion, it is necessary to coat the fiber after it is drawn but before it comes into contact with any surface. Inasmuch as the application of a coating material must not damage the glass surface, the coating material is applied in a liquid state. Once applied, the coating material must solidify before the glass fiber reaches the capstan. This is typically accomplished within a brief time interval by photocuring—a process in which the liquid coating material is converted to a solid by exposure to electromagnetic radiation.

Because the fibers are thin and flexible, they are readily bent when subjected to mechanical stresses such as those encountered during handling or exposure to varying temperature environments. Such bends in the fiber frequently result in loss that is much greater than the intrinsic loses of the fiber itself, and it has been found desirable to protect the glass fiber against such bending. Accordingly, the coating material is required to cushion the glass fiber against bends and two layers of coating materials are typically applied to the drawn optical fiber. An inner (primary) coating, having a relatively low modulus, is applied directly to the glass fiber; and an outer (secondary) coating, having a relatively high modulus, surrounds the primary coating. Together, these coatings desirably protect the inherently high tensile strength of the glass fiber so long as the primary coating material remains bonded to the glass. However, in what appears to be a contradictory requirement, it is also desirable to be able to easily strip the coating(s) from the glass fiber—particularly when a number of fibers are bonded together in an array such as shown in U.S. Pat. No. 4,900,126 which leads to yet another performance attribute that coating materials need to possess. Indeed, if the coating materials cannot be cleanly and easily stripped, then splicing and connectorizing operations will be seriously hampered.

U.S. Pat. No. 4,472,021 discloses a strippable coating for an optical fiber which comprises from about 2% to about 20% of an organic polysiloxane additive having a plurality of hydroxy-terminated groups which are joined to some of the silicon atoms in the polysiloxane chain by a carbon-to-silicon bond. This particular additive, however, exhibits low adhesion to the glass fiber which adversely affects the handling properties of of the coated optical fiber during the manufacturing process. Low adhesion is a problem which, in the worst case, leads to "delamination" and the ensuing incursion of water, particularly upon exposure to high humidity, which attacks the glass surface and reduces tensile strength.

What is needed, and seemingly what is not disclosed in the prior art, is an additive for use in a coating for optical fibers which improves strippability while still maintaining adhesion to the glass fiber.

SUMMARY OF THE INVENTION

An optical fiber comprises a glass portion for guiding lightwaves which is covered by one or more layers of a coating material to protect the glass from abrasion. The coating material is improved by adding 1–20% by weight of a non-crosslinked hydrocarbon component to a formulation comprising: an oligomer (50–80% by weight); a diluent (less than 50% by weight); and other additives (5–35% by weight). The improved coating material is easily removed from the glass portion while maintaining good adhesion thereto during normal use and handling.

In a preferred embodiment of the invention, the oligomer has an overall structure C-B-A-B-C in which "A" represents a polyol, "B" represents diisocyanate, and "C" represents hydroxy-terminated alkyl acrylate. The hydrocarbon component has the structure $R_1-(R-)_n-R_2$; where $R_1$, $R_2$ comprises an alkyl group or an OH group, and R is a combination of C, H or C, H, O.

In an alternate embodiment of the invention, the need for a diluent is substantially eliminated by using an oligomer having the structure E-D-E where "D" represents a carboxy-terminated polyol, and "E" represents a glycidyl acrylate.

BRIEF DESCRIPTION OF THE DRAWING

The invention and its mode of operation will be more clearly understood from the following detailed description when read with the appended drawing in which.

DETAILED DESCRIPTION

Figure 1:
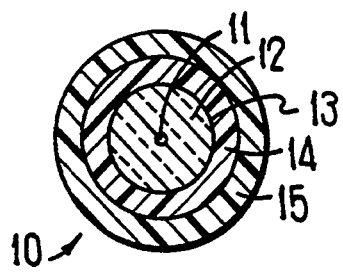
FIG. 1 is an end view, in cross section, of an optical fiber which includes a coating system.

FIG. 1 shows an end view, in cross section, of a coated optical fiber 10 comprising a glass fiber 12 surrounded by a protective coating system comprising layers 14, 15. It is well known to draw glassy optical fiber from a specially prepared, cylindrical preform which has been locally and symmetrically heated to a temperature of about 2000° C. As the preform is fed into and through a furnace, glass fiber 12 is drawn from the molten material. A protective coating system is applied to the glass fiber 12 after it has been drawn from the preform which preferably comprises two layers of radiation-cured polymeric materials. An inner layer 14 contacts the glass fiber 12 at a glass-coating interface 13 and is referred to as a primary coating material. An outer layer 15, which is referred to as a secondary coating material, surrounds the inner layer. One method of applying dual layers of coating materials to a moving glass fiber is disclosed in U.S. Pat. No. 4,474,830 which issued on Oct. 2, 1984 to C. R. Taylor. Another method for applying dual layers of coating materials onto glass fiber is disclosed in U.S. Pat. No. 4,851,165 which issued on Jul. 25, 1989 to J. A. Rennell and C. R. Taylor. By way of illustration, the typical diameter of glass fiber 12 is about 125 micrometers, while the diameter of its core generally less than 10 micrometers for single mode fibers. (Core 11 is the region where light is substantially confined during its propagation along the glass fiber's longitudinal axis by the refractive index profile of the glass fiber.) And finally, each layer of coating material has a thickness of about 30 micrometers so that the overall diameter of coated fiber 10 is approximately 250 micrometers.

Figure 2:
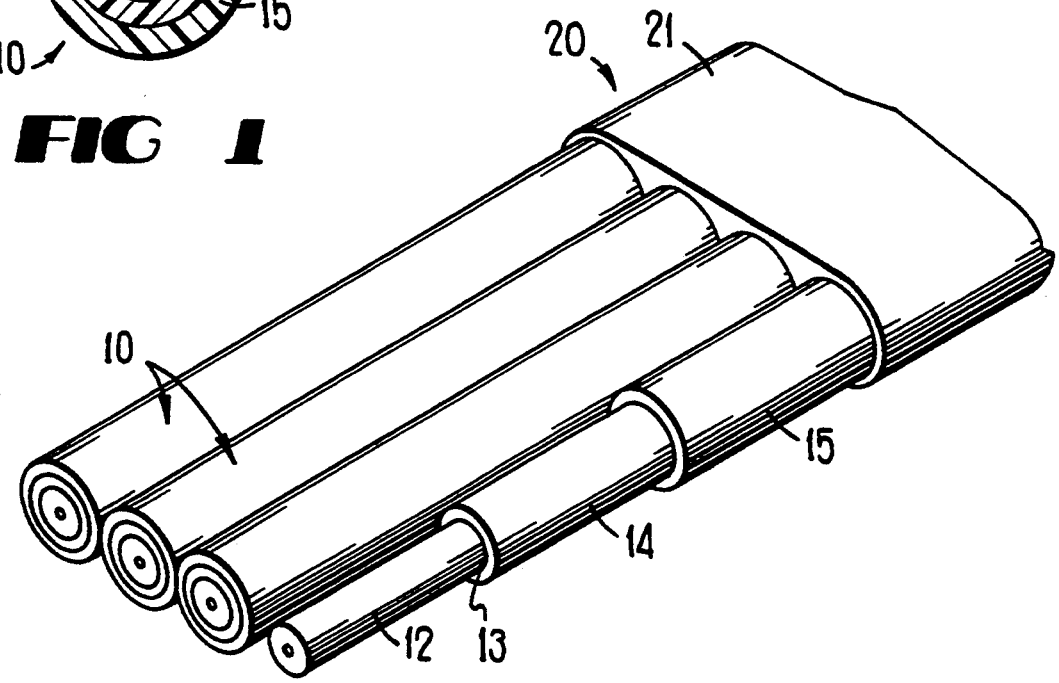
FIG. 2 is a perspective view of an optical fiber ribbon showing a group of coated glass fibers bonded together with a matrix material.

Referring now to FIG. 2, there is shown a perspective view of an optical fiber ribbon 20 showing a group of coated glass fibers 10—10 that are held together with an ultraviolet (UV)-curable matrix bonding material 21. The group of optical fibers are disposed in a coplanar parallel array, and while only four (4) fibers are shown, such arrays typically comprise twelve (12) individual fibers. The modulus of the matrix material has a value less than that of the outer coating layer of the fiber but greater than the modulus of the inner coating layer. The matrix material 21 fills the interstices, bonds together the optical fibers, and extends to the outside boundary of the ribbon. A typical UV-curable matrix material 21 is a mixture comprising a resin, a diluent and a photoinitiator. The resin may include a diethylenic-terminated resin synthesized from a reaction of a hydroxy-terminated alkyl acrylate with the reaction product of a polyester of polyether polyol of molecular weight of 1000 to 6000 Dalton with an aliphatic or aromatic diisocyanate, or a diethylenic-terminated resin synthesized from the reaction of glycidyl acrylate with a carboxylic-terminated polymer or polyether of molecular weight 1000 to 6000 Dalton. The diluent may comprise monofunctional or multifunctional acrylic acid esters having a molecular weight of 100 to 1000 Dalton or N-vinylpyrrolidinone. For the photoinitiator, the composition may include ketonic compounds such as diethoxyacetophenone, acetophenone, benzophenone, benzoin, anthraquinone, and benzil dimethyl ketal. In a typical composition, the bonding matrix may include a resin (50–90%), diluents (5–40%), and a photoinitiator (1–10%). All percentages are by weight unless otherwise noted. Other bonding matrices may include a methacrylate, a UV-curing epoxide or an unsaturated polyester. More detailed information regarding bonded arrays of optical fibers is available in the aforementioned U.S. Pat. No. 4,900,126.

Bonded arrays of optical fibers, as discussed above, are commercially available from AT&T under the trademark of AccuRibbon® lightguide cable, and is especially useful for high fiber count installations; in the loop and metropolitan area networks where splicing and installation productivity are paramount. Each ribbon comprises 12 color-coded fibers for easy identification, and as many as 12 ribbons are stacked together for high density. The ribbon stack is surrounded by a core tube which may also contain a filler that prevents the incursion of water in outside plant applications.

Ribbon Stripping

Figure 3A:
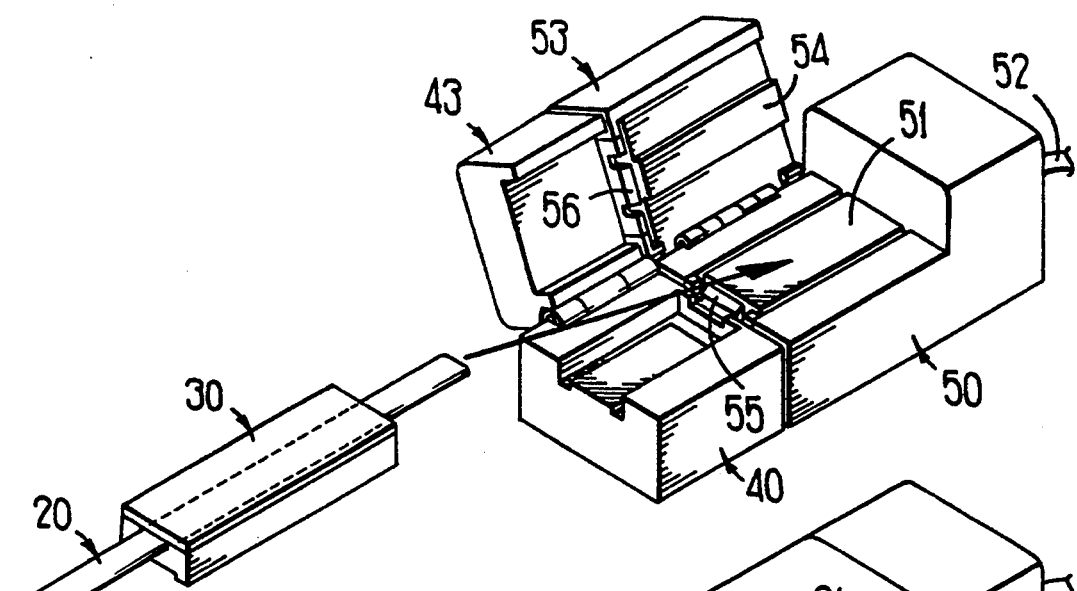
FIGS. 3A–3C illustrate the use of a ribbon-stripping tool showing three progressive stages in the removal of matrix and coating materials from a group of glass fibers.
Figure 3B:
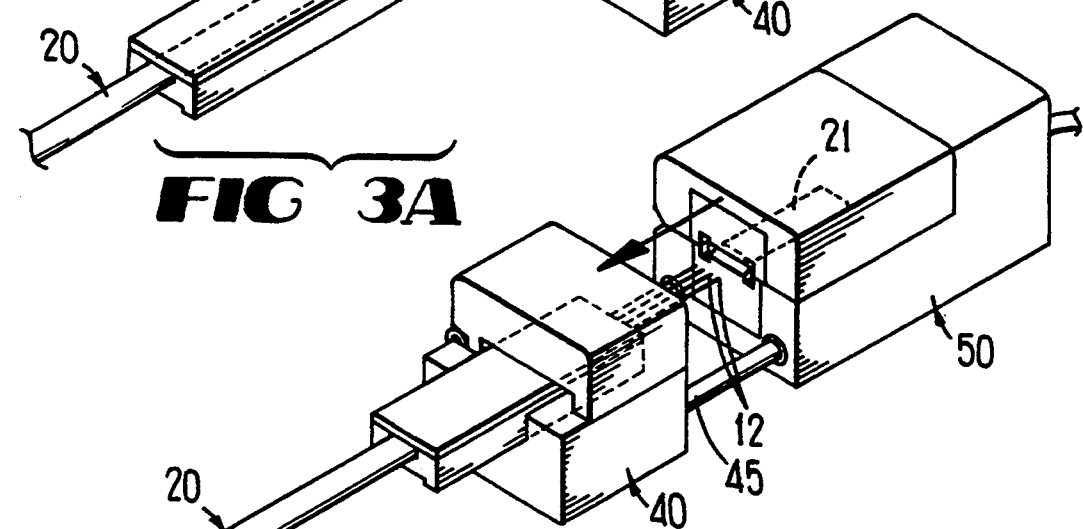
Figure 3C:
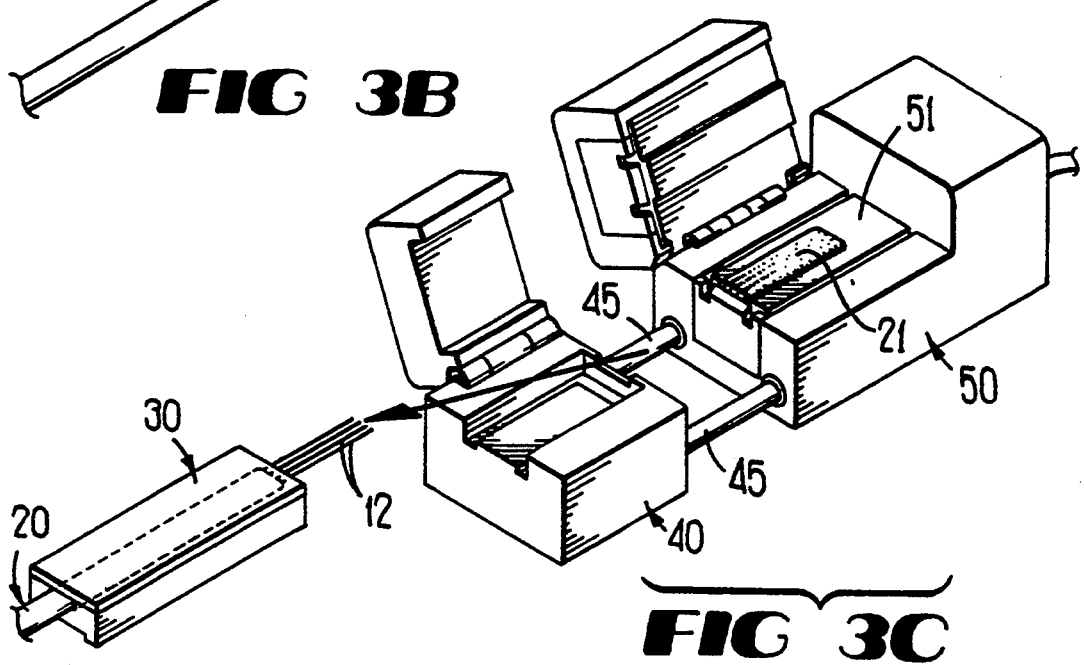

Reference is made to FIG. 3A–3C which illustrate the use of a ribbon-stripping tool such as used by splicing technicians for mass fusion splicing. FIG. 3A shows the principal elements of the ribbon stripping tool and associated apparatus. Ribbon 20 is placed within fiber holder 30 to facilitate handling of the fiber during the stripping process. The stripping tool comprises holder grip 40 and main body 50 which are used for removing the various layers that surround a bonded fiber array. Lid 53 is closed during the stripping operation and includes an inner surface 54 which cooperates with a heated platen 51 to frictionally hold the outside jacket material surrounding the glass fibers within ribbon 20.

Referring first to FIG. 3A, fiber holder 30 is shown in its closed position around ribbon 20 which about to be inserted into the ribbon-stripping tool. The portion of ribbon 20 which is to have its coating layers removed extends beyond the forward end of the fiber holder so that it, can be captured between platen 51 and the inside surface 54 of lid 53 when the lid is closed onto the main body 50. Upon closure, opposing blades 55, 56 are positioned to cut partially into opposite sides ribbon 20 so that a well-defined break in the coating material can be made. The particular tool used is electrically heated from an AC power source which is converted to 12 volts DC for use by a heater element within the main body 50. Holder grip 40 is adapted to capture fiber holder 30 therein when its lid 43 is closed.

FIG. 3B illustrates the movement of holder grip 40 away from the main body 50 of the ribbon-stripping tool. Guide rails 45—45 allow the holder grip to slide into engagement with the main body in a controlled manner. A heater (not shown) within the main body raises the temperature of platen 51 to a predetermined level which weakens/breaks the adhesive bond at the interface 13 between primary coating 14 and glass fiber 12 (see FIG. 1 or 2) of the various coated fibers. Illustratively, a temperature of 100° C. for about 2 minutes provides acceptable results. Once the bond is weakened/broken the rest of the operation involves sliding the primary coating along the glass fiber surface. The ability of the primary coating to slide will depend on it sliding friction with the glass fiber. This action will determine how easily the composite (matrix 21 and coatings 14, 15) can be removed and the amount of residue that remains on the bare glass fibers. Therefore, a non-crosslinking and non-reactive additive is incorporated into the primary coating formulation which remains mobile (i.e., free to diffuse) in the primary coating after cure so that when the stripping operation is performed the additive will be present at the surface of glass fiber 12 to thereby reduce sliding friction.

Figure 4A:
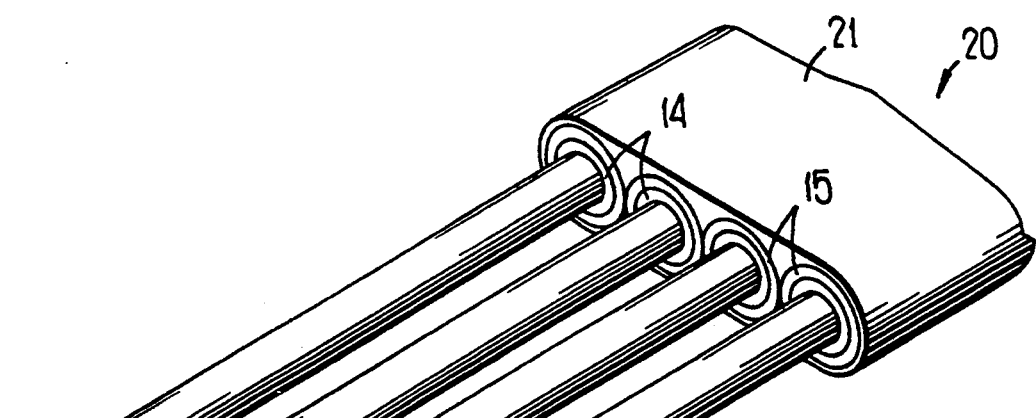
FIG. 4A–4C illustrate various outcomes of the ribbon-stripping procedure.
Figure 4B:
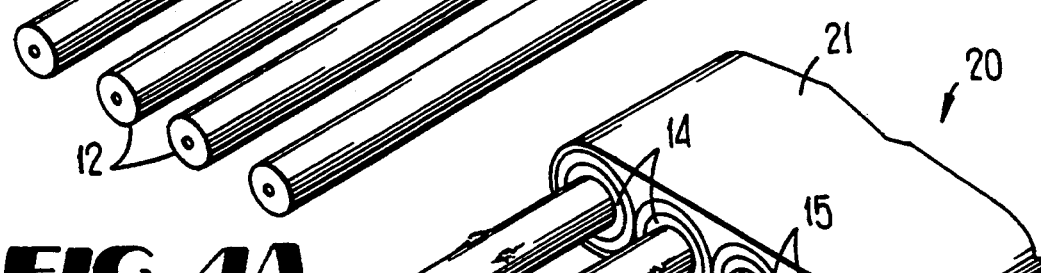
Figure 4C:
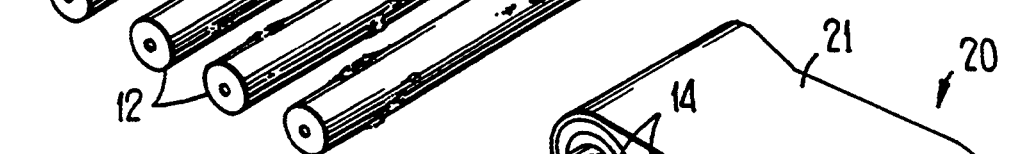

Finally, FIG. 3C shows end results of the ribbon stripping process in which glass fibers 12—12 protrude from ribbon 20 which is still held within the fiber holder 30. And matrix material 21 which has just been stripped away remains on the heated platen 51 of the main body 50. Having stripped the matrix and coating materials away from the glass fibers 12—12, FIG. 4A–4C are used for illustrating the various possible results of the stripping process and for discussing their acceptability. For example. FIG. 4A shows an ideal condition wherein the matrix 21 and coating materials 15 are fully removed from the glass fibers 12—12. Such results are frequently possible with the present invention although the presence of some residues 16—16, as shown in FIG. 4B, is also acceptable provided they can be removed by gentle wiping with an alcohol-moistened cotton swab. However, FIG. 4C illustrates an unacceptable condition in which the coating materials have dung to the glass fibers so tenaciously that either breakage occurs or large patches remain that cannot be easily removed.

Coating Materials

Coating materials not only protect the glass fiber from abrasion and cushion it against microbending loss, but they also help preserve its tensile strength. However, in order to preserve tensile strength, the coating materials must stay bonded to the glass—at least until they are stripped off, and then it is desirable that they be fully removable without leaving a residue on the glass. More specifically, the interface between the primary coating material and the glass fiber must be characterized by suitable strength to prevent delamination, and must be such that the coating system can be stripped from the optical fiber without tenacious residues being left on the fiber surface. On the other hand, the surface of the secondary coating material must be such that tacking does not occur between adjacent convolutions of the fiber, resulting in a jerky payoff from a process spool.

Typical coating materials comprise urethane acrylate liquids whose molecules become crosslinked when exposed to ultraviolet light. Various additives are also present that enhance one or more properties of the coating. For example, photoinitiators are added to accelerate the curing process which is important because coated optical fiber is wrapped around spools for storage as soon as it is cured, and manufacturing speed is critical to profitability.

Curing is the conversion of the liquid coating material to a solid. In the present system this process is known as free radical cure wherein, upon absorption of light, the photoinitiator components cleave to form free radical pairs which diffuse away from each other and react with acrylate-terminated components to initiate a chain polymerization process. In addition to photoinitiators, coating materials further include diluents, antioxidants, adhesion promoters and, in some cases, additives to improve strippability. However, before addressing strippability, it is important to first discuss the composition of the primary coating material which makes contact with the glass surface, and whose properties are the subject of the present invention.

In the preferred embodiment of the invention, primary coating 14 comprises a 30 micron-thick layer of a material that surrounds glass fiber 12. It has a low modulus (e.g., $10^6$ Pa) to cushion the glass fiber against sharp bends that cause loss to a lightwave signal. The primary coating illustratively comprises an oligomer (50–80%), a diluent (15–40%), and additives (5–35%). The oligomer is derived from polyol ("A") which has been reacted with diisocyanate ("B"), and capped with hydroxy-terminated alkyl acrylate ("C"). The resulting structure is of the form C-B-A-B-C where:

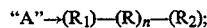

where:
$R_1$, $R_2$ is an OH group;
R is a combination of C, H or C, H, O; and
$2 \leq n \leq 1000$.

where:
$R_3$ is an alkyl or aromatic group.

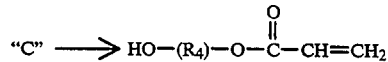

where:
$R_4$ is an alkyl group with 2–6 carbon atoms.

Illustratively, phenoxyethylacrylate is a suitable diluent for use in the optical fiber coating of the present invention which serves to decrease the viscosity of the oligomer resin. However, decreased viscosity can also be achieved through use of an epoxy acrylate oligomer having the general structure E-D-E, in which case the amount of diluent used can be reduced to less than 15%. In this situation, a carboxy-terminated polyol, designated "D", comprises the following structure:

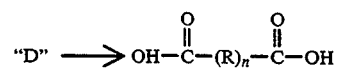

where:
R is a combination of C, H or C, H, O; and
$2 \leq n \leq 1000$.

and a glycidyl acrylate, designated "E," comprises the following structure:

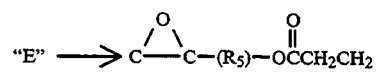

where:
($R_5$) is an alkyl group.

Various polyols (alcohols containing plural hydroxyl groups) may be used in the oligomer chain including:
(i) polycarbonate;
(ii) polyester;
(iii) polyether;
(iv) polybutadiene; or
(v) hydrogenated polybutadiene.

Additives

Selection of the proper additive to facilitate removal of the primary coating from a glass fiber without severely limiting its adhesion thereto is a non-trivial problem, particularly because both properties are required and appear to be mutually exclusive. However, as with so many such problems, compromises are possible because there exists a region where both removability and adhesion are acceptable. This is to say that the adhesive force need not be much greater than the highest force expected during handling; nor should it be much less than the lowest force expected when the coating is being intentionally stripped from the fiber. And whereas the prior art discloses the addition of polysiloxane to enhance strippability, it has been discovered, much to our surprise, that the addition of hydrocarbon components to the coating material, in an amount from about 1–20%, appear to cover the above-mentioned region. For example, maximum acceptable adhesion is provided when only 1% of the hydrocarbon component is added, and minimum acceptable adhesion is provided when 20% of the hydrocarbon component is added. The use of hydrocarbon components to achieve these desired results is surprising because formulators historically have avoided the use of non-crosslinkable components due to anticipated and/or observed detrimental properties in the cured form. Additives blended into the coating material either bind to the coating material, bind to the glass after the coating material is applied, or are free to migrate. The latter type are sometimes called fugitive because they do not form crosslinks. Unfortunately, many of the fugitive additives cause loss of adhesion or increased surface tack.

Among the additives, an antioxidant is present in an illustrative amount of about 0.5%, an adhesion promoter is present in an illustrative amount of 0.5–2.0%, and a photoinitiator is present in an illustrative amount of about 2%. Most importantly, hydrocarbon component additives have been found to provide surprisingly beneficial effects on ribbon strippability, with an appropriate degree of adhesion, when they are present, in an amount 1–20%.

In a preferred embodiment of the invention, polytetrahydrofurandiol (a polyether), having the following structure, is used in forming the oligomer:

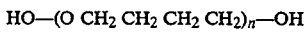

$$HO-(O\ CH_2\ CH_2\ CH_2\ CH_2)_n-OH$$

Further, in the preferred embodiment of the invention, polytetrahydrofurandiol is used as the hydrocarbon component. Indeed, although not required in the present invention, the preferred hydrocarbon component additive comprises the same polyol used in forming the oligomer.

Figure 5:
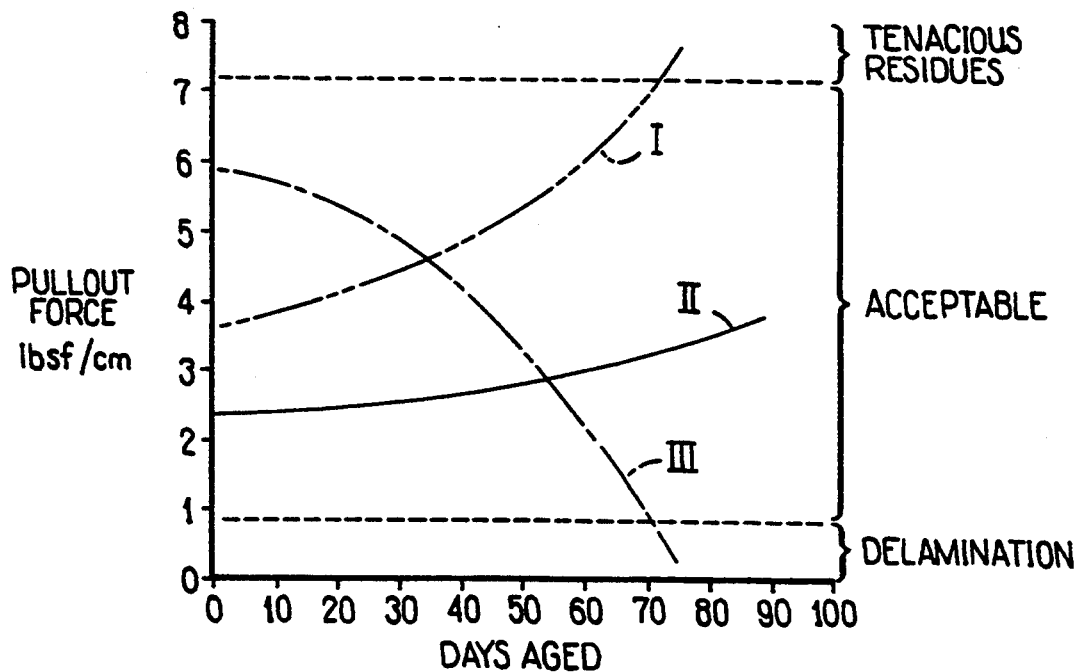
FIG. 5 is a graph which illustrates the effect of aging on pullout force for dual-coated fiber.

Reference is now made to FIG. 5 which is a graph that illustrates the effect of aging on pullout force for a dual-coated fiber. In particular, the region which is designated as being "ACCEPTABLE" defines the amount of force needed to remove the coating from a dual-coated fiber without problem. When adhesion between the coating material and the glass fiber becomes too great, as indicated by curve I, it is most difficult to remove the coating from the glass fiber without breakage. Frequently, the fiber does not break, and yet some coating material remains attached to the glass after a portion has been removed (see e.g., FIG. 4C). When adhesion between the coating material and the glass fiber becomes too little, as indicated by curve III, the above-described problem of delamination occurs which may lead to the incursion of water and consequent weakening of the glass fiber's tensile strength. Finally, curve II illustrates the beneficial result of adding hydrocarbon components in an amount 1–20% to the coating material. In this situation, the stripping force of the coating material is sufficiently low so that tenacious residues do not remain on the glass fiber, yet sufficiently high that delamination is not a problem. The ACCEPTABLE region is quantitatively shown in FIG. 5 based on measurements of the stripping force required to remove coating materials from a dual-coated fiber as a function of time for various coating materials.

It has been observed that migration of the added hydrocarbon components is such that they may also be used in the secondary coating, albeit with reduced effectiveness. And while various embodiments of the invention have been shown and described, it is recognized that modifications may be made by those of ordinary skill which are within the spirit and scope of the present invention.

We claim:

1. A coated optical fiber comprising an optical glass for guiding lightwaves and an enhanced coating material disposed about the optical glass, the enhanced coating material comprising 50–80% by weight of an oligomer, less than 50% by weight of a diluent, and 5–35% by weight of additives, said additives including a stabilizer, an adhesion promoter, a photoinitiator, and a non-crosslinked hydrocarbon component.

2. The coated optical fiber of claim 1 wherein the oligomer comprises the reaction product of a polyol component "A," a diisocyanate component "B," and a hydroxy-terminated alkyl acrylate "C", said oligomer having the following structure: C-B-A-B-C.

3. The coated optical fiber of claim 2 wherein the polyol component of the oligomer is selected from one of the following:
   (i) polyester;
   (ii) polyether;
   (iii) polycarbonate;
   (iv) polybutadiene;
   (v) hydrogenated polybutadiene.

4. The coated optical fiber of claim 3 wherein the polyol component of the oligomer comprises polytetrahydrofurandiol.

5. The coated optical fiber of claim 4 wherein the hydrocarbon component comprises polytetrahydrofurandiol.

6. The coated optical fiber of claim 1 wherein the hydrocarbon component is the polyol used in forming the oligomer.

7. The coated optical fiber of claim 1 wherein the additives further include 0.5–2.0% by weight of a photoinitiator.

8. The coated optical fiber of claim 1 wherein the enhanced coating material comprises less than 15% by weight of a diluent.

9. The coated optical fiber of claim 8 wherein the oligomer comprises the reaction product of a carboxy-terminated polyol "D" and a glycidyl acrylate "E" having the following structure: E-D-E.

10. The coated optical fiber of claim 1 wherein the enhanced coating material comprises 15–40% by weight of a diluent.

11. The coated optical fiber of claim 10 wherein the hydrocarbon component comprises the following structure:

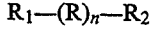

$$R_1-(R)_n-R_2$$

where:
   $R_1$, $R_2$ is an alkyl group or an OH group; and
   R is a combination of C, H or C, H, O; and
   $2 \leq n \leq 1000$.

12. The coated optical fiber of claim 1 wherein the optical fiber includes a primary and a secondary layer of coating material disposed about the optical glass, the primary layer being in immediate contact with the optical glass and comprising the enhanced coating material.

13. An optical fiber ribbon comprising a plurality of coated optical fibers that have been bonded together by a matrix material, each of said coated optical fibers comprising a glass portion for conducting lightwaves and a layer of coating material for protecting the glass portion, said coating material comprising 50–80% by weight of an oligomer, less than 50% by weight of a diluent, and 5–35% by weight of additives, said additives including a stabilizer, an adhesion promoter, a photoinitiator, and a non-crosslinked hydrocarbon component for improving strippability, said hydrocarbon component being present in an amount equal to 1–20% by weight.

14. The optical fiber ribbon of claim 13 wherein the hydrocarbon component comprises the following structure:

$$R_1—(R)_n—R_2$$

where:

$R_1$, $R_2$ is an alkyl group or an OH group; and
R is a combination of C, H or C, H, O; and
$2 \leq n \leq 1000$.

15. The optical fiber ribbon of claim 14 wherein the oligomer comprises the reaction product of a polyol "A," a diisocyanate "B," and a hydroxy terminated alkyl acrylate "C" having the following structure: C-B-A-B-C.

16. The optical fiber ribbon of claim 14 wherein the coating material comprises 15–40% by weight of a diluent.

17. The optical fiber ribbon of claim 15 wherein the oligomer comprises the reaction product of a carboxy-terminated polyol "D" and a glycidyl acrylate "E" having the following structure: E-D-E.

18. A plurality of longitudinally extending optical fibers which are disposed in an array with longitudinal axes thereof being substantially parallel to one another, the array being bonded together by a curable matrix material which fills interstices between adjacent fibers, each of said optical fibers comprising a glass portion for conducting lightwaves and a layer of coating material for protecting the glass portion, said coating material comprising 50–80% by weight of an oligomer, less than 50% by weight of a diluent, and 5–35% by weight of additives, said additives including a stabilizer, an adhesion promoter, a photoinitiator, and a non-crosslinked hydrocarbon component for improving strippability, said hydrocarbon component being present in an amount equal to 1–20% by weight.

* * * * *